(12) United States Patent
Wintermann

(10) Patent No.: US 11,859,085 B2
(45) Date of Patent: Jan. 2, 2024

(54) HEMP AND PBAT BIOPOLYMER SUBSTRATE

(71) Applicant: Charlotte A. Wintermann, Seattle, WA (US)

(72) Inventor: Charlotte A. Wintermann, Seattle, WA (US)

(73) Assignee: REearthable, LLC, Seattle, WA (US)

( * ) Notice: Subject to any disclaimer, the term of this patent is extended or adjusted under 35 U.S.C. 154(b) by 163 days.

(21) Appl. No.: 17/249,650

(22) Filed: Mar. 9, 2021

(65) Prior Publication Data

US 2021/0277245 A1 Sep. 9, 2021

Related U.S. Application Data

(60) Provisional application No. 62/986,744, filed on Mar. 8, 2020.

(51) Int. Cl.
| | | |
|---|---|---|
| *C08L 97/02* | (2006.01) | |
| *C08L 67/04* | (2006.01) | |
| *C08L 67/02* | (2006.01) | |
| *C08K 3/26* | (2006.01) | |

(52) U.S. Cl.
CPC ............. *C08L 97/02* (2013.01); *C08K 3/26* (2013.01); *C08L 67/02* (2013.01); *C08L 67/04* (2013.01); *C08K 2003/265* (2013.01); *C08K 2201/005* (2013.01); *C08L 2201/06* (2013.01); *C08L 2205/025* (2013.01)

(58) Field of Classification Search
CPC .......... C08L 97/02; C08L 67/02; C08L 67/04; C08L 2201/06; C08L 2205/025; C08L 99/00; C08K 2201/018; C08K 2201/005; C08K 3/26; C08K 2003/265
See application file for complete search history.

(56) References Cited

U.S. PATENT DOCUMENTS

| | | | |
|---|---|---|---|
| 8,507,581 B2 | 8/2013 | MacLeod | |
| 2012/0288650 A1* | 11/2012 | Freese | C08K 3/36 428/221 |
| 2018/0142097 A1* | 5/2018 | Guemard | C08L 67/02 |
| 2019/0256681 A1* | 8/2019 | LaPray | C08J 11/16 |

OTHER PUBLICATIONS

Shrivastava, A.; Introduction to Plastics Engineering, 2018, p. 4.*

* cited by examiner

*Primary Examiner* — Edward J Cain
(74) *Attorney, Agent, or Firm* — Emerson, Thomson, & Bennett, LLC; Roger D. Emerson; Matt J. Wilson

(57) ABSTRACT

Provided is a hemp and PBAT based biopolymer substrate as a replacement composition to various synthetic, or synthetic containing compounds, plastics. The substrate requires no specialized knowledge as known in the art, utilizes existing manufacturing equipment and methods of processing and contains no synthetic polymers. The substrate is biodegradable and compostable, and produces no micro plastic waste when discarded or by degradation. By selectively adjusting the ranges of the biopolymer substrate, various products with attributes of a myriad of plastic products can be manufactured according to their existing methods. The substrate is comprised of compounds from renewable resources and contributes zero greenhouse gas emissions at the end of a products useful life.

4 Claims, No Drawings

HEMP AND PBAT BIOPOLYMER SUBSTRATE

TECHNICAL FIELD

The present invention generally relates to a replacement composition for synthetic or petroleum based plastics for use in the processing of various manufacturing methods. More particularly, the invention relates to a hemp and PBAT substrate that can be used as a replacement for a myriad of goods currently manufactured with synthetic or petroleum based plastics or variations thereof which requires no existing equipment modifications and upon degradation does not generate micro plastic particles.

BACKGROUND

The field of the invention generally relates to a Hemp and PBAT Biopolymer Substrate as a replacement to synthetic polymers or blends for the manufacturing and production of various objects and products as an improvement to current plastic compounds containing some level of synthetic polymers. The invention meets a need of an improved composition that does not produce micro-plastics at end of life disposal or degradation while retaining attributes and property integrity of various synthetic polymer objects wherein existing manufacturing equipment is utilized for production.

DESCRIPTION

There are many examples of synthetic based polymer plastics and variations thereof that we rely for their various useful mechanical properties and in many cases, these compositions have an adverse effect on the environment not only in the production processing but at their end of life usefulness. The Nation's ability to dispose of these plastics is increasingly costly and difficult.

PP (Polypropylene) is stiffer than other polymers and is more resistant to heat and widely used in hot food containers, car parts, disposable diapers and thermal vests to name a few. PET (Polyethylene Terephthalate) is primarily used for food and drink packaging due to its ability to prevent oxygen from permeating the material to spoil the product inside and its malleability. Although PET is most likely to be picked up by recycling programs this type of plastic contains antimony trioxide—a matter that is considered as a carcinogen—capable of causing cancer in a living tissue. In addition as noted further, while PET is highly recyclable, global changes in exporting plastic waste poses a National threat given machinery and processing resources to recycle it. Consequently much of this and other polymer plastic materials end up in landfills taking up to hundreds or more years to decompose while emitting harmful methane (CH4) and Carbon Dioxide (CO2) gases. According to the Environmental Protection Agency (EPA) landfill gas is comprised of approximately 50% methane and 50% Carbon Dioxide. Methane is a greenhouse gas up to 35 times as potent as carbon dioxide as a driver of climate-change over the span of a century. Landfills are the United States' third largest source of methane emissions.

HDPE (High Density Polyethylene) has long, virtually unbranched polymer chains which makes it very dense and thus, stronger and thicker than PET. HDPE is commonly used as grocery bags, juice containers, medicine bottles and garden planters. It is known the aforementioned items in their category commonly have a limited product-lifecycle or are simply intended for single use such as food and pet packaging, utensils, straws and others which constitute about 40% of all plastic waste.

While consumer goods companies and retailers commit to increasing recycled content in their packaging to an average of 25% by 2025 (compared with the current global average of just 2%), less than 5% of US plastics are recycled with the remainder landfilled, burned or exported. According to a report published by Science Advances, only 9% of all plastic ever produced has been recycled with the majority ending up in landfills or the natural environment.

Plastics are made with oil so when oil prices fall, it is inherently cheaper to make fresh plastic. Also in this case using recycled plastic can be more expensive because it has to be sorted and cleaned.

In January 2018 China implemented The National Sword Policy resulting in an estimated 111 million metric tons of plastic waste that will be displaced by 2030. Other countries including India, Indonesia, and Hong Kong have since followed China's lead in limiting the export of plastic waste to their countries. 89% of historical exports consist of polymer groups often used in single-use plastic food packaging (polyethylene, polypropylene, and polyethylene terephthalate). The U.S. alone produced 26 million metric tons of plastic waste in 2016 alone.

Plastic recycle and processing backups have been reported in multiple international countries further contributing to the importance of the invention and attributes disclosed herein.

Plastic PET bottles are the primary source for recyclers. An investment of at least $3 billion in U.S. processing plants alone will be needed over the next decade to achieve companies' goals to increase recycled material content according to a report by research and analysis firm Wood Mackenzie, which does not include additional investments in collection or improved material recovery facilities to manage the magnitude of plastic waste otherwise destined to the landfill.

The price of virgin PET is cheaper than recycled PET for the first time in decades. It is also worth noting the cost of producing virgin plastic relies on the cost of petroleum and natural gas which continually fluctuate (in addition to cost of disposal based on supply and demand), therefore creating fluid economic scale of plastic product production when their product wholesale prices remain generally the same as does overhead manufacturing production costs. This potentially also leads to a detrimental imbalance of industry which can be minimized or avoided through the adoption of the hemp and PBAT biopolymer invention.

According to The National Geographic Society in their first study in 2018, 91% of all plastic waste isn't recycled and only 12% has been incinerated. Of the 8.3 billion metric tons that has been produced, 6.3 billion metric tons has become plastic waste. Up to six times more plastic was burned in the U.S. in 2018 than was recycled. Burning plastic produces CO2 and can release toxins. The U.S. has seen only one new incinerator since 1997. In 2016, U.S. waste incinerators released the equivalent of 12 million tons of carbon dioxide, more than half of which came from plastics.

According to a 2019 report, Plastic & Climate: The Hidden Costs of a Plastic Planet, globally burning plastic packaging adds 16 million metric tons of greenhouse gases into the air, which is equivalent to more than 2.7 million homes' electricity use for one year, and clearly shows incinerating plastic creates the most CO2 emissions among any plastic waste management method.

Carbon dioxide emissions mainly come from burning organic materials such as coal, oil, gas, wood, and solid waste. Since most packaging includes some level of polypropylene which uses fossil fuels such as crude oil, plastic is the largest contributing offender to emitting carbon dioxide or methane gases both when incinerated and left to degrade under their natural cycle taking tens if not hundreds or thousands of years.

Due to synthetic polymer mechanical attributes or other additives that make up the many products we rely on today (PP, PET, HDPE and others) several additives have been designed to break down synthetically formulated compounds including the polypropylene polymers. This is commonly known as "OXO" biodegradable or "degradable" as micro plastics that cannot be seen by the human eye are created and still exist upon degradation and contribute to polluting our environment and oceans. Micro plastics can come from a variety of sources including larger plastic pieces that have broken apart, resin pellets used for plastic manufacturing, or in the form of microbeads.

Of the 260 million tons of plastic the world produces each year, about 10 percent ends up in the Ocean, according to a Greenpeace report. Seventy percent of the mass eventually sinks, damaging life on the seabed. As of 2020, scientists calculate that the top 200 meters of ocean alone contains up to 21 million metric tons of micro plastic which does not include micro fibers.

While the present invention presents many advantages over other polymer and biopolymer plastics and alternatives, one of the more prominent advantages in the unique invention described herein is the use of natural and sustainable composition as a plastic alternative resulting in zero emissions of harmful gases currently created from landfill plastic waste and requires no modifications to standard manufacturing or waste management disposal processing nor facility equipment. An additional prominent feature is the biodegradability and compostability of the composition that creates no micro plastic residue and the end of a products useful life. In addition, the advantages of a composition that contains zero petroleum polymers while still meeting the needs of various plastic product attributes for rigidity, form, and weight, is also naturally UV and fire resistant.

There are many other unique advantages of the invention described herein such as the abundance of limestone and hemp in the United. States and other countries. Hemp, for example, is grown in mixed crop farming to benefit other crops, matures within approximately four months when it is then harvested, and requires no special fertilizers or pesticides to replant immediately for the next sustainable crop. It can grow several years in the same location with no special requirements, requires less water due to its 3 foot root depth and can be planted densely with no adverse planting effects.

Recycling is broken, commercial composting facilities limited and municipalities are cancelling select plastic recycling due to lack of equipment, capabilities and steep capital investments not previously anticipated with the drastic changes regarding overseas export of waste. Therefore, a sustainable biodegradable and compostable plastic alternative such as the composition disclosed herein using widely available natural and renewable materials is an important advancement to reducing both the current and future dilemma of plastic waste. The present invention addresses those issues with a substrate composition that is capable of exhibiting mechanical properties of other polymers used to produce various plastic products without the harmful effects of current polymer and mixed biopolymer resins to the environment.

A hemp and biopolymer substrate as disclosed herein is comprised of hemp. When Hemp fibers are extracted from stems what remains is 70-77% cellulose. Cellulose is a homogeneous linear polymer constructed of repeating glucose units: the building blocks of trees and plants. Industrial hemp has been scientifically proven to absorb more $CO_2$ per hectare than any forest or commercial crop. The qualities and environmental benefits such as the fully sustainable use of all hemp plant parts and wherein the hemp stalk traps Carbon Dioxide out of the atmosphere indefinitely and releases oxygen as a byproduct, combined with the current global plastic waste, recycling and greenhouse gas emissions problems, the use of and adoption of the described biopolymer invention presents an important long term improved solution to plastics production and environmental issues resulting from it.

A hemp and biopolymer substrate also comprises of PLA (Polyactic Acid or other variations such as PCL's, thermal plastic aliphatic polyester). PLA is a type of resin from plants, with high strength, outstanding plasticity and easy to be machine-shaping ability. PLA is a bio based compound derived from natural resources and offers a significant reduction in carbon footprint compared to oil-based plastics.

Limestone ($CaCO_3$), another compound comprised herein is non-toxic, harmless to human beings or the environment. Limestone makes up about 10% of the total volume of all sedimentary rocks and in processed powdered form found to be inexpensive, simple to process and widely abundant.

PBAT or aliphatic-aromatic co polyester's such as that known under one brand name of Ecoflex® has properties similar to PE-LD due to its high molecular weight and its long chain branched molecular structure. This serves as an elongation, malleable or flexible component with physical properties that are suitable to blown film, cast film or any number of other manufactured processing systems. Additionally PBAT's are biodegradable and compostable, and include uses such as the production of bags, packaging, and other such useful products in similar categories.

It is widely understood that many of these noted compounds have shortfalls in becoming synthetic polymer plastic replacements of their own accord due to various limitations including but not limited to melt temperature, lack of elasticity, brittleness and other such attributes required of useful plastic product replacements, thereby further supporting the need for a unique hemp and PBAT biopolymer that can address and overcome known issues.

An exemplary embodiment of a hemp and PBAT biopolymer substrate of the present invention comprises approximately ten to thirty percent (10-30%) of Calcium Carbonate ($CaCO_3$) by weight in a one to three (1-3) powdered micron form, industrial Hemp from approximately fifteen to thirty five percent (15% to 35%) by weight, approximately three to eighteen percent (3-30%) PLA (Polylactic Acid) or PCL (Polycaprolactone) by weight which can include any one of a series of compounds such as those sold under the brand names Luminy®, Capa6500® or any similar such product known in the art. PCL (Polycaprolactone) is a biodegradable polyester. Both PLA and PCL's are thermoplastics.

In another exemplary embodiment, the substrate comprises of approximately ten to forty percent (10-40%) biodegradable aliphatic-aromatic polyester (PBAT) by weight such as that sold under the trademark of Ecoflex®, or any one of a series of PBAT's formulated for biodegradability. Though the product Exoflex® is not limited to the invention as described herein, Ecoflex® biodegrades to the basic monomers 1,4-butanediol, adipic acid and terephthalic acid and eventually to carbon dioxide, water and biomass when metabolized in the soil or compost under standard conditions.

In another exemplary embodiment, the substrate comprises approximately twenty to thirty five percent (20-35%) hemp by weight or reinforced polymer granules such as those sold under the brand names GreenGran®, Trifilon® or others (which can include any one of a series of compounds that are bio-based composites containing hemp). Both are resins derived from starch (and cellulose), which are plant-based and often reinforced with industrial hemp fibers.

In another exemplary embodiment, the substrate may include a biodegradation additive from approximately three fourths of a percent to two percent (0.75-2.0%) by weight. The biodegradation additive may include a chemo-attractant such as Ecopure® (which can include any one of a series of formulations of organic molecules or polymer chains that are tailored to non-biodegradable polymers) or any similar such biodegradable additive known in the art. These products allow microbes to create a biofilm that coats the plastic waste. The biofilm forms on treated plastics once it comes in contact with certain enzymes and microbes found in landfills, compost piles or the ocean. These microbes send out chemical signals, a part of the quorum sensing process, that attract other microbes. Through this process, the microbes break down the chemical bonds of polymer chains to biodegrade them at an accelerated rate.

Although several embodiments have been described in detail for purposes of illustration, various modifications may be made to each of the formulations compound inclusion percentages without departing from the scope and spirit of the invention. Accordingly, the invention is not to be limited in scope to any particular product or manufacturing process. All references to percentages herein are references to percentage by weight, unless specifically noted otherwise.

While the present invention and corresponding methods have been described in connection with various illustrative embodiments, it is to be understood that other similar embodiments may be used or modifications and additions may be made to the described embodiments for performing the same function disclosed herein without deviating therefrom. Further, all embodiments disclosed are not necessarily in the alternative, as various embodiments may be combined or subtracted to provide the desired characteristics. Variations can be made by one having ordinary skill in the art without departing from the spirit and scope and process hereof. Therefore, the biopolymer plastic alternative composition and corresponding methods disclosed herein should not be limited to any single embodiment, but rather construed in breadth and scope in accordance with the recitations of the subject matter.

In certain embodiments, the percentages of each compound for a hemp and PBAT biopolymer substrate falls within the ranges disclosed herein. However, specific percentages of each component or compound's composition are dependent upon the desired end product and its desired mechanical properties. Depending on the particular composition used within these ranges and the desired end product application, the biopolymer substrate's properties will vary and make it suitable for various plastic applications such as, but not limited to, consumer goods, plastic auto-parts, single use packaging, toys and games, food trays, medical trays, disposable cups, furniture, water bottles, medical packaging, pet toys, office supplies, sporting goods, electrical and household goods and any other variety of materials manufactured from the same, for various industries.

In the spirit of various embodiments a hemp and PBAT composition wherein the compound loads can be modified within the scope identified herein can create a diverse set of varying products including but not limited to those for aerospace, food and product packaging (included but not limited to plastic bags and containers whether malleable or rigid), kitchen utensils (both single use and intended longer life product uses such as straws, plates or containers respectively) or a portion incorporated thereof, household and business items (such as folio sleeves or a writing apparatus, garbage can, plastic bag, cling film and picture frames), marine and boating parts, floating devices of various forms, outdoor furniture or gardening materials, toys and games, beverage apparatuses including but not limited to cups and containers, baby supplies (including but not limited to diapers, cribs, safety devices, toys or other products in this category), auto parts, medical devices or medical parts, cosmetic containers, gaming supplies, pet toys, novelty items both seasonal and non-seasonal such as holiday ornaments and tchotchke's, and apparel including but not limited to shoes or laces, clothes hangers, jewelry or other such items as known to the apparel and apparel accessory industry.

Description of Preferred Embodiments

In one exemplary embodiment which has properties suitable for malleable plastic parts such as a light switch plate cover comprises of approximately: (A) 25-35% Calcium Carbonate; (B) 15-22.5% Hemp from seeds (oil, powder or alternative aggregated form representing a biodegradable hemp resin), (C) 1%-2% biodegradable Eco-Pure® additive, (D) 15-25% EcoFlex® PBAT, (E) 20-30% PLA as a Bio-Polymer (F) 20-25% hemp.

In another exemplary embodiment which has properties suitable for rigid plastic parts, in this example specifically compounding the substrate for a Yoyo, the embodiment is comprised of the following approximate compounds: (A) 30-40% hemp from seeds, (B) 15-25% Limestone (CaCO3), (C) 20-30% PLA as a Biopolymer (D) 15-40% PBAT, and (E) 1-2% biodegradable additive.

And, in an exemplary embodiment as a sheet for thermoplastic forming such as is used to manufacture food service trays, the substrate comprises of approximately: (A) 25-40% PBAT, (B) 25-30% Limestone, (C) 0.05-1% Ecopure®, and (D) 15-30% PLA.

Process for Formulation

Akin to creating a relevant mixture for a 2 foot concrete retaining wall versus a 10 foot concrete retaining wall wherein formulation attributes are all critical to the function, longevity and structural strength of any particular item, each has their own mechanical density, strength, and elasticity end product requirements to fulfill their role as a useful item. The ultimate composition and properties of the disclosed invention is dependent on its end use is related to the process of mixing dry compounds so as to be cohesively mixed first, then any remaining liquid compounds separately mixed also in cohesion with each other which is the first key to a successful compound.

Following, powder and liquid compounded materials are then mixed in the process below as to create ultimate even dispersion and cohesion of a final compound ready for manufacturing.

First, the composition of the substrate requires the application of CaCO3 to be evenly dispersed throughout the resin blend in various amounts ranging from 30% to 50% by weight and with other powdered compounds. Whether the CaCO3 is treated or untreated but in a powered state and 90%+ pure in sizes ranging from 1-3 microns, it is then sifted into other powdered compounds to achieve an evenly distributed powder mix. The amount of other powders is in the ratio of 2-20% by weight. Powdered compounds must be blended in a dry and powdered state. Any additional dry compounds are mixed in the percentage ranges identified herein including those such as PBAT, PLA, PCL or hemp granules.

Second, the compounding process then requires all liquids such as hemp oil from seeds, Biopolymers or other additive liquids to be consistently blended as a separate batch, independent of the first, and heated to a range of between 150 and 300 degrees Fahrenheit, processed and mixed in a heated agitation for a period of time between 2-4 hours for a consistently dispersed and blended integration of the inclusive liquid compounds prior to any powdered compound batch introductions. Processing temperature ranges may vary depending on formulation, manufacturing process and properties desired of a final product.

In the final stage of compounding, the process requires a merging meld of the heated processed and agitated liquid batch, with the processed agitated powdered batch to create a slurry or roux wherein a mixture is created in a heated state where they can thermodynamically activate at temperatures in the 150-330 Fahrenheit range. It is in this range which there is cohesion between the two within this specific temperature value. The blend of Limestone or other dry compounds must be added in an even fill to the melted batch compounds mass ratio whereas by weight, the liquid batch is between 20-50% of the dry batch formulation. The two batches of compounds are added together and must be continuously agitated for a period of time between 2-hours to its desired consistency for any given manufacturing process requirement.

The resulting biopolymer composition is now ready and compatible for any given manufacturing process such as thermoforming, extrusion blow molding, molding or other methods and processing as known in the art.

There must be a short thermal process in correlation to the slurry agitation within specific time parameters prior to either the vacuum forming or an injection molding processes depending upon desired end product formation. There is an injection of air in the majority of end product processes that is directly relevant to the substrates native characteristic as applied to the end product and must be observed as a product specific time value.

The process as described produces the substrate in a balanced and even dispersion suitable for standard manufacturing production equipment and processes as described, but not necessarily limited to those as provided as examples herein.

During the early stages of production and development in identifying a successful composition as a replacement for synthetic polymer products, several challenges ensued including notably, working with non-synthetic compounds in order to achieve various attributes of various useful plastic replacement items. By identifying specialized and varying non synthetic polymers in various selective loads by weight and combining the compounds in the disclosed process, the hemp and PBAT biopolymer composition formed a strong cohesion to retain not only the best of the initial compounds' various unique structure and attributes, but that with a uniform compounded master batch. This technique led to a successful composition, regardless of varying thermal and other properties of each compound noted herein to create a highly efficient and durable biopolymer suited to traditional manufacturing processing as a replacement to traditional synthetic or mixed synthetic plastic products as a biodegradable and compostable replacement. It should be noted that in of themselves, each of the herein discussed individual compounds are challenged to create a meaningful use as a plastic replacement product for several reasons. For example tensile strength (enough durability or flexibility to be useful), manufacturing challenges (elongation or lack thereof wherein reaction to processing heat may compromise a material), and expected everyday functional uses serving a purposeful life for that individual product. This also includes microwavable and freezable products. Additionally, attributes such as elongation, stretch and flexibility to achieve certain product requirements or alternately stiffness, bending stiffness, bend modulus or rigidity are also generally challenged to produce meaningful products as intended for their useful life.

A hemp and PBAT composition that in certain embodiments can be customized for the use in blow film extrusion, extrusion blow molding, extrusion, thermoforming, rotational and vacuum forming, injection molding, blow molding, CNC machining, 3D printing or other such plastic processing methods as known in the art for the production of various materials as stated herein.

BACKGROUND

The various embodiments and aspects described herein relate to a composition that can be used as an alternative to producing various plastic products and objects. Various issues relating to synthetic polymer based plastics with harmful impact to the environment and end of life disposal challenges are commonly known. Accordingly, there is a need for an improved plastic alternative compound without reliance on fossil fuels, greenhouse gas contributions, manufacturing changes or specialized knowledge as practiced, and understood in the art.

What is claimed is:

1. A biopolymer substrate having a formulation comprising:
   from about 15 to 35% hemp by weight;
   from about 3 to 30% polylactic acid by weight;
   from about 10 to 40% polybutylene adipate terephthalate by weight;
   from about 10 to 30% calcium carbonate, by weight, wherein the calcium carbonate particles are from about 1 to 3 microns in size;
   from about 0.75 to 2% of a chemo-attractant; and
   wherein the formulation of the biopolymer substrate is combined to form a mixture wherein the mixture forms a biopolymer substrate that is both biodegradable and compostable.

2. The biopolymer substrate of claim 1, wherein the mixture of the formulation is activated at a temperature between 150 to 330° F.

3. The biopolymer substrate of claim 1, wherein the biopolymer substrate does not compost and/or biodegrade into microplastic particles.

4. The biopolymer substrate of claim 1, wherein the hemp is from about 70 to 77% cellulose.

* * * * *